(No Model.)
J. A. RITTER, Jr., & W. VAN RITTER.
HARVESTER SICKLE.
No. 340,364. Patented Apr. 20, 1886.
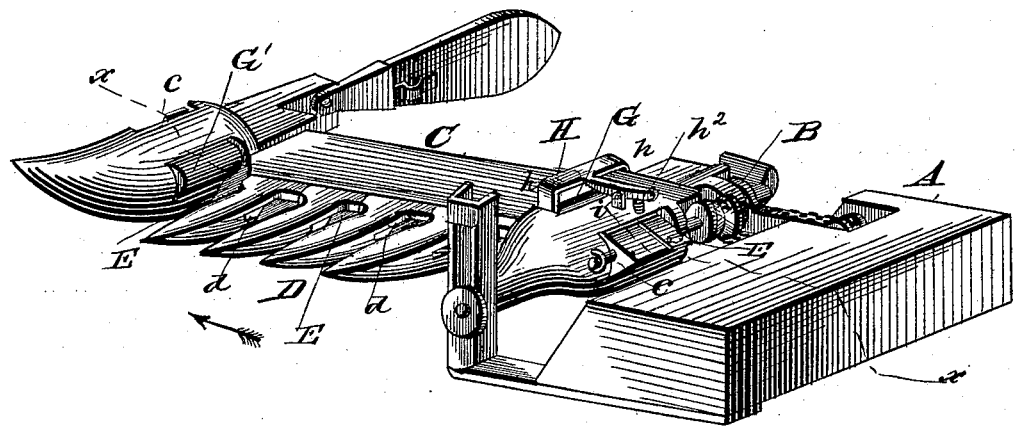
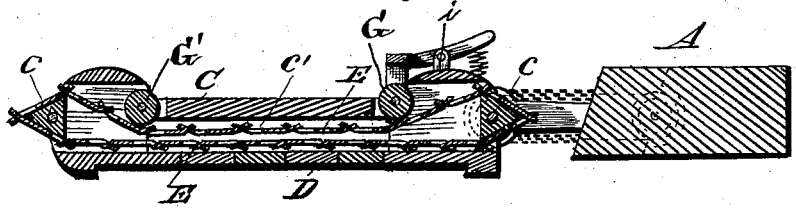
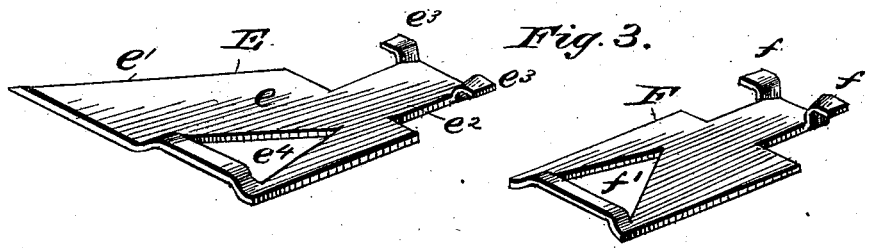
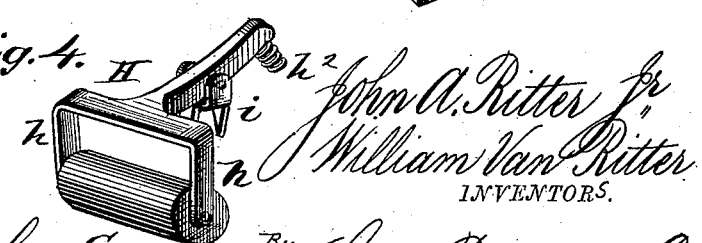
WITNESSES
Phil C. Dieterich.
J. Fred. Reily.
John A. Ritter Jr.
William Van Ritter
INVENTORS.
By Louis Bagger & Co.
Attorney

UNITED STATES PATENT OFFICE.

JOHN ALEXANDER RITTER, JR., AND WILLIAM VAN RITTER, OF WEST BADEN, INDIANA.

HARVESTER-SICKLE.

SPECIFICATION forming part of Letters Patent No. 340,364, dated April 20, 1886.

Application filed May 4, 1885. Serial No. 164,291. (No model.)

*To all whom it may concern:*

Be it known that we, JOHN ALEXANDER RITTER, Jr., and WILLIAM VAN RITTER, both residents of West Baden, in the county of Orange and State of Indiana, have invented certain new and useful Improvements in Harvester-Sickles; and we do hereby declare that the following is a full, clear, and exact description of the invention, which will enable others skilled in the art to which it appertains to make and use the same, reference being had to the accompanying drawings, which form a part of this specification.

Our invention relates to that class of cutting apparatus for harvesting-machines in which the knives or sections move with an endless chain, which passes around suitable pulleys located at each end of the finger-bar; and it consists in certain new and useful improvements in a harvester-sickle of this class, which will be hereinafter fully described, and pointed out in the claim.

Referring to the annexed drawings, Figure 1 is a perspective view of a harvester-sickle in which our invention is embodied. Fig. 2 is a sectional view taken on line $x\ x$, Fig. 1; and Figs. 3 and 4 are detail views in perspective, the nature of which will be hereinafter specified.

Referring to the several parts by letter, A represents part of the frame of the harvester.

B represents the drive-pulley, connected by suitable gearing to the driving-axle or drive-wheel of the machine.

C represents the finger-bar, at each end of which is journaled a triangular roller, $c$, around which the endless chain of knives passes, the pulley on the stubble side of the finger-bar being keyed on the shaft of the drive-pulley B, by which arrangement a suitable rotary motion is imparted to the chain of knives. The rollers $c$ may be of any suitable shape. The finger-bar C has a suitable longitudinal groove, $c'$, and is provided with suitable guard-fingers, D, of ordinary construction, the groove $c'$ in the finger-bar and the slots $d$ in the several guard-fingers being of a sufficient width to permit the double sickle to pass through them in reverse directions. The endless double sickle consists of the knives or sections E and the connecting-links F, placed alternately; or it may be composed exclusively of knives. Each knife is struck out of suitable sickle-steel, in the form shown in Fig. 3, and consists of the blade $e'$, which is beveled and sharpened upon one edge only, (as the knives travel in one direction only,) and the base or body portion $e$, the projecting end $e^2$ of which is formed with the wings or projections $e^3$, which are bent upward and outward, so as to adapt them to engage a suitable opening in one end of the connecting-link F, the opposite side of the base $e$ being provided with an opening, $e^4$, to adapt one end of the link F to engage therewith, the link being formed with the upwardly and outwardly projecting wings $f$ at one end, adapted to engage the opening $e^4$ of a knife, and having the opening $f'$ in its other end, with which the projecting wings of a knife, E, engage.

G G' represent guide-rollers, which are journaled near each end of the finger-bar between and in close proximity to the triangular rollers, which carry the double sickle, one of these rollers, G, being journaled between the lower ends of the downwardly-projecting arms $h$ of a pivoted support or bearing, H. (Shown in detail in Fig. 4.) This supporting device is pivoted at $i$ at the stubble end of the finger-bar, its inner extremity, which extends beyond the pivotal point, bearing upon a spring, $h^2$, which serves to press the roller G down upon the double sickle at that end of the finger-bar, so as to bring the parts of the chain close together, and also to take up any slack which may occur through wear, and which would otherwise cause the chain to run loosely and unevenly. The other roller, G', also serves to hold the parts of the chain close together at the outer or grain end of the finger-bar. The endless sickle moves in the direction shown by the arrow in Fig. 1 of the drawings, the cutting-edges of the knives passing each other in opposite directions, thereby forming a shear cut. The rollers $c$ are formed triangular in cross-section, to prevent the chain of knives from slipping in passing around them.

From the foregoing description, taken in connection with the accompanying drawings, the construction and operation of our improved harvester-sickle will be readily understood without requiring further explanation.

It will be seen that the endless sickle is exceedingly simple in construction, as the teeth themselves form a part of the endless chain, and the teeth and connecting-links are each formed of a single piece of metal shaped to the requisite form in suitable dies.

By constructing the teeth and connecting-links in the manner described they can be rapidly and easily connected together in their operative position, and where a tooth or section becomes broken or worn (which is liable to occur through the blades striking against stones, &c., in the harvest-field) it can be instantly removed and a new tooth or section substituted by any person without the need of any tools, thereby effecting a saving both in time and money. The spring-actuated roller G prevents all looseness in the endless chain of knives, thereby causing the double sickle to run smoothly and evenly.

Having thus described our invention, what we claim, and desire to secure by Letters Patent of the United States, is—

The herein-described endless sickle, composed of the knives and connecting-links, arranged alternately, consisting each of a single piece of metal provided at one end thereof with the upwardly and outwardly projecting lugs, arranged as described, and at the other with a suitable aperture, to adapt the knives and links to be hinged or connected together to form an endless chain of knives, as described.

In testimony that we claim the foregoing as our own we have hereunto affixed our signatures in presence of two witnesses.

JOHN ALEXANDER RITTER, JR.
WILLIAM VAN RITTER.

Witnesses:
BENJAMIN F. MCIVER,
WILLIAM M. BAXTER.